(12) United States Patent
Ramirez et al.

(10) Patent No.: US 11,434,800 B2
(45) Date of Patent: Sep. 6, 2022

(54) PREDICTIVE AMMONIA RELEASE CONTROL

(71) Applicant: PACCAR Inc, Bellevue, WA (US)

(72) Inventors: Jorge Rafael Lozada Ramirez, Calexico, CA (US); Carl Anders Hergart, Heaton (GB); Cynthia Chaffin Webb, Sedro-Woolley, WA (US); Christopher S. Balton, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 17/141,038

(22) Filed: Jan. 4, 2021

(65) Prior Publication Data
US 2022/0213823 A1  Jul. 7, 2022

(51) Int. Cl.
*F01N 3/20* (2006.01)
*F02D 41/02* (2006.01)
(Continued)

(52) U.S. Cl.
CPC ............ *F01N 3/208* (2013.01); *B60W 10/06* (2013.01); *B60W 10/11* (2013.01); *B60W 30/188* (2013.01); *B60W 50/0097* (2013.01); *F02D 41/0235* (2013.01); *G01C 21/3453* (2013.01); *G05B 13/048* (2013.01); *B60W 2510/06* (2013.01); *B60W 2552/00* (2020.02); *B60W 2552/05* (2020.02); *B60W 2710/0644* (2013.01); *B60W 2710/0688* (2013.01);
(Continued)

(58) Field of Classification Search
CPC .. F01N 3/208; F01N 2610/02; F01N 2900/04; F01N 2900/08; F01N 2900/10; B60W 10/06; B60W 10/11; B60W 30/188; B60W 50/0097; B60W 2552/00; B60W 2552/05; B60W 2510/06; B60W 2710/0644; B60W 2710/0688; B60W 2710/1005; B60W 2900/00; F02D 41/0235; G01C 21/3453; G05B 13/048
See application file for complete search history.

(56) References Cited

U.S. PATENT DOCUMENTS

2015/0027106 A1* 1/2015 De Filippo ......... F02D 41/1463
60/274
2017/0106338 A1* 4/2017 Singh ..................... F01N 3/208
(Continued)

FOREIGN PATENT DOCUMENTS

DE   10 2018 214 842 A1   3/2020
EP           1 712 764 A1   10/2006
(Continued)

*Primary Examiner* — Edwin A Young
(74) *Attorney, Agent, or Firm* — Seed IP Law Group LLP (57) ABSTRACT

Embodiments are directed towards controlling uncontrolled release of ammonia from an engine of a vehicle. An estimated status of the engine is determined prior to an event, such as an estimated load on the engine prior to the vehicle going up a hill. A predictive model of uncontrolled ammonia release is generated for the estimated status. At least one engine-related countermeasure is selected based on the predictive model. If the predictive model of uncontrolled ammonia release with the selected countermeasures satisfies a threshold condition, then the selected engine-related countermeasure is employed.

20 Claims, 7 Drawing Sheets

(51) Int. Cl.
*B60W 30/188* (2012.01)
*B60W 10/11* (2012.01)
*B60W 10/06* (2006.01)
*B60W 50/00* (2006.01)
*G05B 13/04* (2006.01)
*G01C 21/34* (2006.01)

(52) U.S. Cl.
CPC . *B60W 2710/1005* (2013.01); *B60W 2900/00* (2013.01); *F01N 2610/02* (2013.01); *F01N 2900/04* (2013.01); *F01N 2900/08* (2013.01); *F01N 2900/10* (2013.01)

(56) References Cited

U.S. PATENT DOCUMENTS

2020/0263583 A1* 8/2020 Balthes .................. F01N 3/035
2021/0123391 A1* 4/2021 Binetti ................. F01N 3/2066

FOREIGN PATENT DOCUMENTS

EP        2 541 011 A1    1/2013
WO    2015/048099 A1    4/2015

* cited by examiner

PREDICTIVE AMMONIA RELEASE CONTROL

BACKGROUND

Technical Field

The present disclosure generally relates to vehicle-exhaust-management systems, and more particularly, to predictive-ammonia-release control systems.

Description of the Related Art

Regulatory air pollution limits for diesel engines have caused heavy-duty diesel truck manufacturers to adopt engine aftertreatment systems for treating diesel exhaust gases before release into the atmosphere. An aftertreatment system can include a plurality of catalytic units to reduce pollutants, including particulate soot (unburned hydrocarbons) and nitrogen oxide (NOx). One component of an aftertreatment system may be a selective catalytic reduction system to reduce the release of NOx. The function of the selective catalytic reduction system is to convert NOx species into nitrogen ($N_2$) and water through chemical reduction with a reductant species. The reductant species is usually ammonia. Ammonia is generated upon decomposition of urea, which is dosed as a solution via a diesel exhaust fluid doser.

In some systems and situations, ammonia passes through the selective catalytic reduction system un-reacted, which is often referred to as ammonia slip. Ammonia slip occurs when ammonia is over-injected into the gas stream from the source of diesel exhaust fluid or when temperatures are too low for ammonia to react, or the catalyst has degraded. Some engine pollutant sensors sense this ammonia slip as an increased release of NOx. The selective catalytic reduction system may take further actions to reduce this interpreted release of NOx, which can result in decreased engine performance and efficiency. It is with respect to these and other considerations that the embodiments described herein have been made.

BRIEF SUMMARY

Embodiments are generally directed to system and methods of predicting the uncontrolled release of ammonia from an engine and employing countermeasures to reduce such release of ammonia. Briefly, the uncontrolled ammonia release is predicted based on an anticipated or future event associated with the vehicle, such as the vehicle is approaching a hill or other type of topography. One or more countermeasures, such as downshifting or changing engine speed, are employed prior to the event to reduce the uncontrolled release of ammonia.

A method of controlling uncontrolled release of ammonia from an engine of a vehicle may be summarized as including determining, by at least one processor, an estimated status of the engine prior to an event; generating, by the at least one processor, a predictive model of uncontrolled ammonia release for the estimated status; selecting, by the at least one processor, at least one engine-related countermeasure based on the predictive model; and employing the selected at least one engine-related countermeasure.

The method may further include determining, by the at least one processor and prior to selecting the at least one engine-related countermeasure, that the predictive model satisfies at least one threshold condition.

The method may further include determining, by the at least one processor and prior to selecting the at least one engine-related countermeasure, a criticality of uncontrolled ammonia release based on the predictive model; and selecting, by the at least one processor, the at least one engine-related countermeasure based on the determined criticality of uncontrolled ammonia release.

Determining the criticality of uncontrolled ammonia release may further include determining, by the at least one processor, a change in enthalpy of the engine from a current status of the engine to the estimated status.

The method may further include modifying, by the at least one processor, the predictive model based on the selected countermeasure; and selecting, by the at least one processor, at least one different countermeasure based on the modified predictive model.

Determining the estimated status on the engine prior to the event may include determining, by the at least one processor, a current location of the vehicle; determining, by the at least one processor, a route of travel of the vehicle from the current location based on a road map; identifying, by the at least one processor, a hill along the route of travel based on a topography map; and determining, by the at least one processor, the estimated status on the engine based on one or more characteristics of the identified hill.

Selecting at least one engine-related countermeasure may include at least one of: selecting, by the at least one processor, an increase to a current speed of the engine; selecting, by the at least one processor, an increase in temperature of combustion of the engine; or selecting, by the at least one processor, a downshift operation from a current gear selection of the vehicle.

A predictive-ammonia-release control system for a vehicle may be summarized as including a memory that stores computer instructions; and at least one processor that executes the computer instructions to: determine an estimated status of an engine of the vehicle prior to an event; generate a predictive model of uncontrolled ammonia release for the estimated status; select at least one engine-related countermeasure based on the predictive model; and employ the selected at least one engine-related countermeasure.

The at least one processor may further execute the computer instructions to: determine, prior to selecting the at least one engine-related countermeasure, that the predictive model satisfies at least one threshold condition.

The at least one processor may further execute the computer instructions to: determine, prior to selecting the at least one engine-related countermeasure, a criticality of uncontrolled ammonia release based on the predictive model; and select the at least one engine-related countermeasure based on the determined criticality of uncontrolled ammonia release.

The at least one processor may determine the criticality of uncontrolled ammonia release by further executing the computer instructions to: determine a change in enthalpy of the engine exhaust gas from a current status of the engine to the estimated status.

The at least one processor may further execute the computer instructions to: modify the predictive model based on the selected countermeasure; and select at least one different countermeasure based on the modified predictive model.

The at least one processor may determine the estimated status on the engine prior to the event by further executing the computer instructions to: determine a current location of the vehicle; determine a route of travel of the vehicle from the current location based on a road map; identify a hill along the route of travel based on a topography map; and determine the estimated status on the engine based on one or more characteristics of the identified hill.

The at least one processor may select at least one engine-related countermeasure by further executing the computer instructions to: select a change in a current speed of the engine; select an increase in temperature of combustion of the engine; or select a downshift operation from a current gear selection of the vehicle.

A non-transitory computer-readable storage medium having stored thereon instructions that when executed by at least one processor, may cause the at least one processor to perform actions, may be summarized as including determining an estimated status of the engine prior to an event; generating a predictive model of uncontrolled ammonia release for the estimated status; selecting at least one engine-related countermeasure based on the predictive model; and employing the selected at least one engine-related countermeasure.

Execution of the instructions by the at least one processor, may cause the at least one processor to perform further actions, the further actions including determining, prior to selecting the at least one engine-related countermeasure, that the predictive model satisfies at least one threshold condition.

Execution of the instructions by the at least one processor, may cause the at least one processor to perform further actions, the further actions including determining, prior to selecting the at least one engine-related countermeasure, a criticality of uncontrolled ammonia release based on the predictive model; and selecting the at least one engine-related countermeasure based on the determined criticality of uncontrolled ammonia release.

Execution of the instructions by the at least one processor, may cause the at least one processor to perform further actions, the further actions including modifying, by the at least one processor, the predictive model based on the selected countermeasure; and selecting at least one different countermeasure based on the modified predictive model.

Determining the estimated status on the engine prior to the event may include determining a current location of the vehicle; determining a route of travel of the vehicle from the current location based on a road map; identifying a hill along the route of travel based on a topography map; and determining the estimated status on the engine based on one or more characteristics of the identified hill.

Selecting at least one engine-related countermeasure may include at least one of: selecting a change in a current speed of the engine; selecting, by the at least one processor, an increase in temperature of combustion of the engine; or selecting, by the at least one processor, a downshift operation from a current gear selection of the vehicle.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
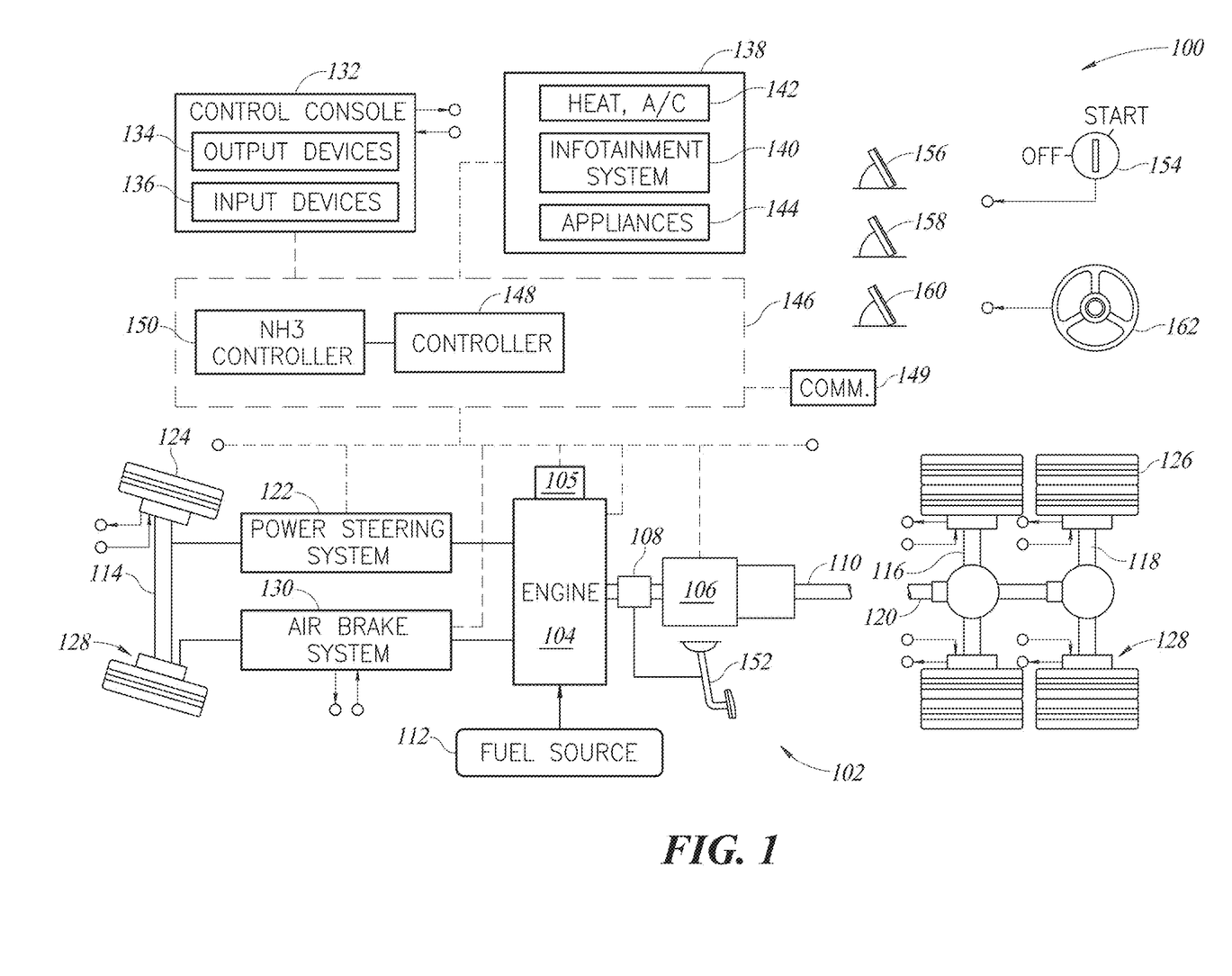
FIG. 1 is a schematic block diagram of a vehicle employing one embodiment of a predictive ammonia release control system in accordance with embodiments described herein.

FIG. 1 is a schematic block diagram of a vehicle 100, such as a Class 8 tractor or other vehicle, employing one embodiment of a predictive-ammonia-release control system, in accordance with embodiments described herein. The vehicle 100 includes a powertrain system 102. In the embodiment shown in FIG. 1, the powertrain system 102 includes an engine 104 (e.g., internal combustion engine), a transmission 106, and a clutch assembly 108. The transmission 106 may be a manual transmission, an automated manual transmission, or an automatic transmission that includes multiple forward gears, neutral and a reverse gear operatively connected to an output shaft 110. The clutch assembly 108 may be positioned between the engine 104 and the transmission 106 to selectively engage/disengage the engine from the transmission. The clutch assembly 108 may be actuated manually, pneumatically, hydraulically, electrically, or via any other suitable mechanism. In operation, the engine 104 receives fuel from a fuel source 112 and converts the energy of the fuel into output torque. The output torque of the engine 104 is converted via the transmission 106 into rotation of the output shaft 110.

The vehicle 100 also includes at least two axles such as a steer axle 114 and at least one drive axle, such as axles 116 and 118. The output shaft 110 of the transmission 106, which may include a vehicle drive shaft 120, is drivingly coupled to the drive axles 116 and 118 for transmitting the output torque generated by the engine 104 to the drive axles 116 and 118. The steer axle 114 is operatively coupled to a power steering system 122. The power steering system 122 may be powered hydraulically by an engine-mounted pump as shown in FIG. 1 or an electrical pump, or the power steering system may be fully electrical with no direct connection to the engine 104. In at least one embodiment, the power steering system 122 includes an electrically driven steering pump or it may be directly driven with no pump. The steer axle 114 supports corresponding front wheels 124 and the drive axles 116 and 118 support corresponding rear wheels 126, each of the wheels having service brake components 128. In some embodiments, the service brake components 128 include air brake components of an air brake system 130, such as an electrically driven compressor, compressed air supply/return lines, brake chambers, etc. In some embodiments, the brake system may include hydraulic brakes. In other some embodiments, the brake system may utilize electrical air compressors that are not connected to the engine 104, or brakes that are directly electrically actuated without a pneumatic system. The service brake components 128 may also include wheel speed sensors, electronically controlled pressure valves, and the like, to effect control of the vehicle braking system.

The vehicle 100 may further include a cab mounted operator interface, such as a control console 132, which may include any of a number of output devices 134, such as lights, graphical displays, buzzers, speakers, gages, and the like, and various input devices 136, such as digital inputs, touchscreens, toggle switches, push button switches, potentiometers, or the like. The control console 132 may include multiple user interfaces, such as a first user interface in a front portion of the cab and a second user interface in a sleeper portion of the cab.

In some embodiments, the vehicle 100 may further include cab or sleeper mounted electrical systems 138 including an infotainment system 140, a heater and A/C system 142 (e.g., heater, A/C system, auxiliary A/C system), other appliances 144, such as a microwave, a coffee maker, television, electrical outlets for laptops, USB inputs, etc. At least some of these electrical systems may be referred to as "house loads." In at least some embodiments, the vehicle 100 may include a navigational device having GPS or other location capability, CD/DVD or other audio/visual functionality.

The vehicle 100 may include one or more wired or wireless communications systems 149, including radio frequency (RF) or infrared (IR) based communication links. The communications capabilities may include but are not limited to Universal Serial Bus (USB), 802.x (e.g., 802.11, 802.15, 802.16, etc.), cellular, dedicated short-range communications (DSRC), Bluetooth®/nearfield protocols, among others.

The vehicle also includes a control system 146. In various embodiments, the control system 146 includes a controller module or controller 148 and an ammonia controller 150.

The controller module 148 may control various aspects of the vehicle 100, including, but not limited to, the engine 104, the transmission 106, the power steering system 122, the alternator 105, the communications system 106, the control console 132, the electrical systems 138, the brake system 130, etc.

The ammonia controller 150 employs embodiments described herein to predict ammonia release and to employ one or more countermeasure to reduce the actual amount of ammonia release. Briefly, the ammonia controller 150 identifies an upcoming segment of road and its terrain or topography. The ammonia controller 150 predicts an amount of stored ammonia and a predicted amount of enthalpy change that are expected to occur during the upcoming road segment. The ammonia control then predicts the ammonia release and selects or employs one or more countermeasures. In various embodiments, the ammonia controller 150 generates one or more models to represent the predicted ammonia release.

In some embodiments, the ammonia controller 150 iteratively selects different countermeasures and models their impact on the predicted ammonia release to determine the most effective countermeasure (e.g., one or more countermeasures that reduce the predicted ammonia release the most compared to one or more other countermeasures). Once the most effective countermeasures are determined, the ammonia controller 150 may employ the countermeasures, which may include controlling one or more systems or components of the vehicle or presenting a notification to the driver to take action, as discussed further below.

In at least one embodiment, the modeling of predicted ammonia release may be determined by a server or other computing system that is separate or remote from the vehicle. In this way, the remote computing device can determine which countermeasures are most effective for different scenarios of predicted ammonia release. This information can then be provided to the vehicle for storage such that the ammonia controller 150 can identify the upcoming road segment and select the appropriate countermeasure based on the stored information.

The vehicle 100 may also include conventional operator control inputs, such as a clutch pedal 152 (in some manual systems), an ignition or start switch 154, a throttle or an accelerator pedal 156, a service brake pedal 158, a parking brake 160 and a steering wheel 162 to effect turning of the front wheels 124 and/or wheels on other axles of the vehicle 100.

While the vehicle 100 of FIG. 1 may employ a powertrain utilizing an internal combustion engine as the vehicle motive force, the vehicle represents only one of the many possible applications for the systems and methods of the present disclosure. It should be appreciated that aspects of the present disclosure transcend any particular type of land or marine vehicle and any type of powertrain.

Figure 2:
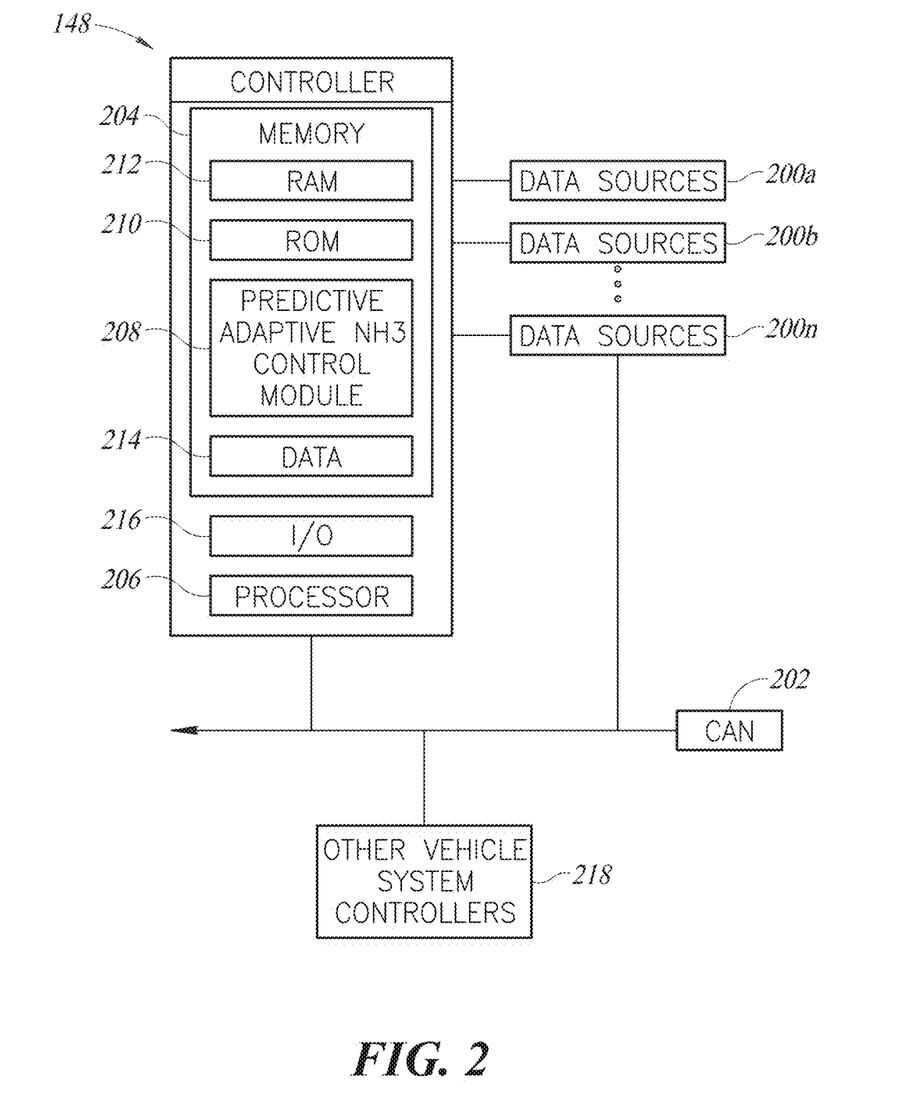
FIG. 2 is a schematic block diagram of a predictive-ammonia-release control system, in accordance with embodiments described herein.

FIG. 2 shows one non-limiting example of the ammonia controller 150 formed in accordance with aspects of the present disclosure. In various embodiments, the ammonia controller 150 may also be referred to as a predictive-ammonia-release controller or a predictive-ammonia-release control system. The ammonia controller 150 may be connected in electrical communication with a plurality of data sources 200a-200n (generally, data sources 200). The data sources 200 may include, but are not limited to, navigation equipment, on-board sensors, on-board state estimators, etc. It will be appreciated that the ammonia controller 150 can be connected directly (wired or wirelessly) to the plurality of data sources 200 or indirectly via any suitable interface, such as a CAN interface 202. Those skilled in the art and others will recognize that the CAN 202 may be implemented using any number of different communication protocols such as, but not limited to, Society of Automotive Engineers ("SAE") J1587, SAE J1922, SAE J1939, SAE J1708, and combinations thereof.

The ammonia controller 150 may also communicate with other electronic components of the vehicle 100 via the CAN 202 for collecting data from other electronic components to be utilized by the ammonia controller 150, and as such, can also be considered in at least some embodiments as data sources 200. For example, the ammonia controller 150 may receive data from one or more other controllers 218, such as an engine controller, a transmission controller, an air suspension system controller, etc. In operation, as will be described in more detail below, the ammonia controller 150 receives signals from the data sources 200, processes such signals and others, and depending on the processed signals, transmits suitable control signals for operating the engine 104, the alternator 105, the power system 146, or other components of the vehicle 100. The ammonia controller 150 may be a standalone controller or may be part of one or more other controllers (e.g., vehicle electronic control unit (VECU)) of the vehicle 100. Generally, the predictive-ammonia-release control system may be implemented in any local or remote controller(s) operative to provide the functionality described herein.

In at least some embodiments, the ammonia controller 150 may contain logic rules implemented in a variety of combinations of hardware circuitry components and programmed processors to effect control of various systems of the vehicle 100. To that end, as further illustrated in FIG. 2, one suitable embodiment of the ammonia controller 150 includes a nontransitory memory 204, a processor 206, and a predictive adaptive ammonia control module 208 for providing functionality of the ammonia controller 150.

The memory 204 may include computer readable storage media in read-only memory (ROM) 210 and random-access memory (RAM) 212, for example. The computer-readable storage media may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, including data 214 (e.g., programmable parameters or various models as described herein).

The ammonia controller 150 also includes one or more input/output devices or components 216 that enable the controller to communicate with one or more local or remote devices via wired or wireless communication. In at least some embodiments, the ammonia controller 150 may include additional components including but not limited to a high speed clock, analog to digital (A/D) and digital to analog (D/A) circuitry, other input/output circuitry and devices (I/O), and appropriate signal conditioning and buffer circuitry.

As used herein, the term processor is not limited to integrated circuits referred to in the art as a computer, but broadly refers to one or more of a microcontroller, a microcomputer, a microprocessor, a central processing unit (CPU), a graphics processing unit (GPU), a programmable logic controller, an application specific integrated circuit, other programmable circuits, combinations of the above, among others. In at least one embodiment, the processor 206 executes instructions stored in memory 204, such as predictive adaptive ammonia control module 208, to implement the functionality described in the present disclosure.

The predictive adaptive ammonia control module 208 may include a set of control algorithms, including program instructions, selectable parameters, and calibrations stored in one of the storage media and executed to provide functions described herein. Information transfer to and from the module 208 may be accomplished by way of a direct connection, a local area network bus, a serial peripheral interface bus, wired or wireless interfaces, etc. The algorithms may be executed during preset loop cycles such that each algorithm is executed at least once each loop cycle. Algorithms stored in the non-volatile memory devices may be executed by the processor 206 to monitor inputs from the sensing devices and other data transmitting devices or polls such devices for data to be used therein. Loop cycles may be executed at regular intervals during ongoing operation of the vehicle 100. Alternatively or additionally, algorithms may be executed in response to the occurrence of one or more events.

The processor 206 communicates with various data sources 200 directly or indirectly via the input/output (I/O) interface 216 and suitable communication links. The interface 216 may be implemented as a one or more integrated interfaces that provide various raw data or signal conditioning, processing, and/or conversion, short-circuit protection, and/or the like. Additionally or alternatively, one or more dedicated hardware or firmware chips may be used to condition and process particular signals before being supplied to the processor 206. In at least some embodiments, the signals transmitted from the interface 216 may be suitable digital or analog signals.

The ammonia controller 150 may be a separate controller that implements the ammonia release prediction and countermeasure functionality described herein. However, it should be appreciated that the ammonia controller 150 may be a controller module, which could be software embedded within an existing on-board controller, such as the engine controller, a general purpose controller, other vehicle system controllers, etc.

As briefly described above, the data sources 200 can include but are not limited to on-board sensors, navigation/GPS devices, data stores, remote servers, etc. The data supplied from these data sources 200 and others may generally or specifically relate to NOx sensor readings, current vehicle location, predictive movement data, temperature data, and engine operating parameters, among others.

Figure 3A:
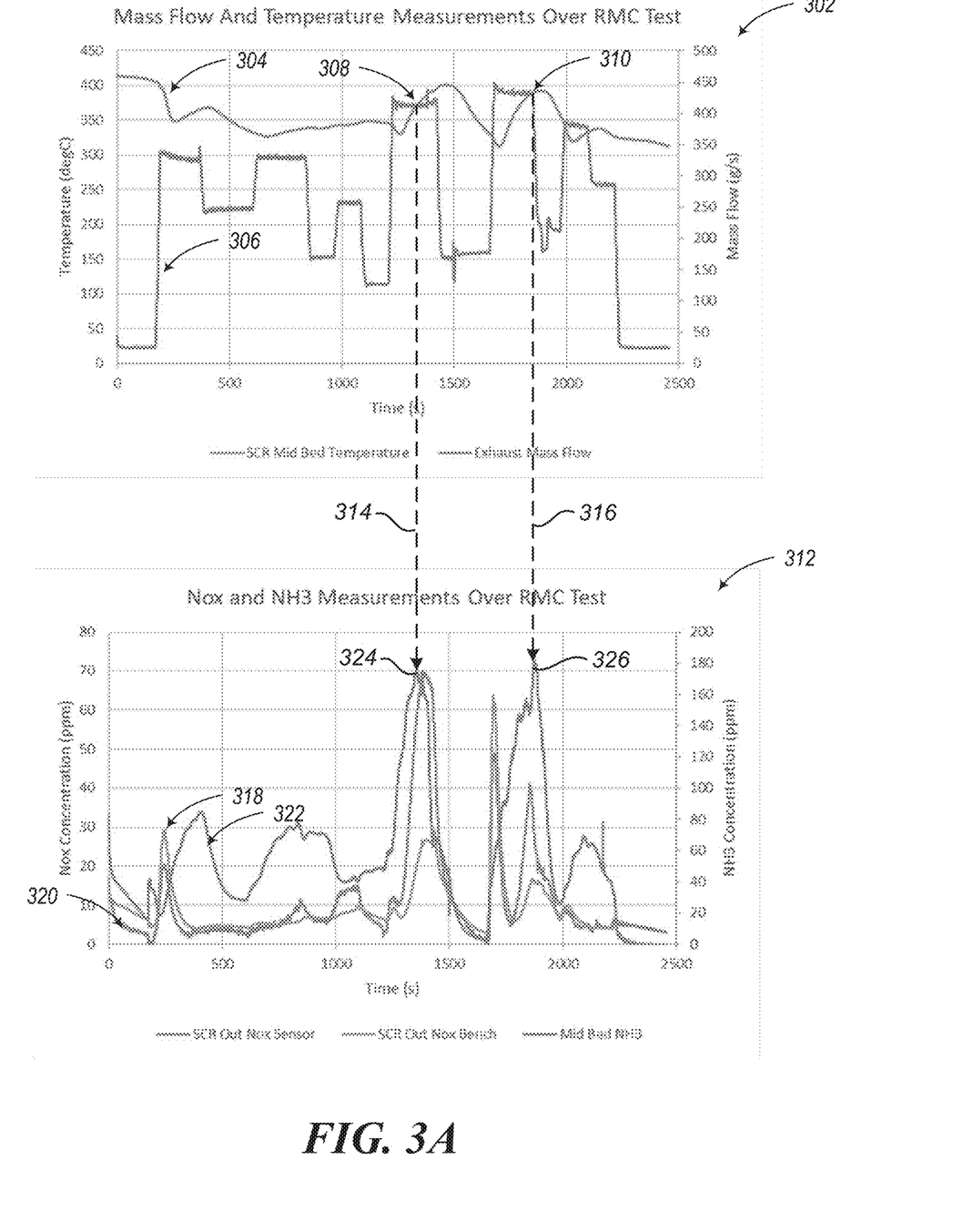
FIGS. 3A-3B are example graphs of results from a ramped mode cycle test of a vehicle engine, in accordance with embodiments described herein.
Figure 3B:
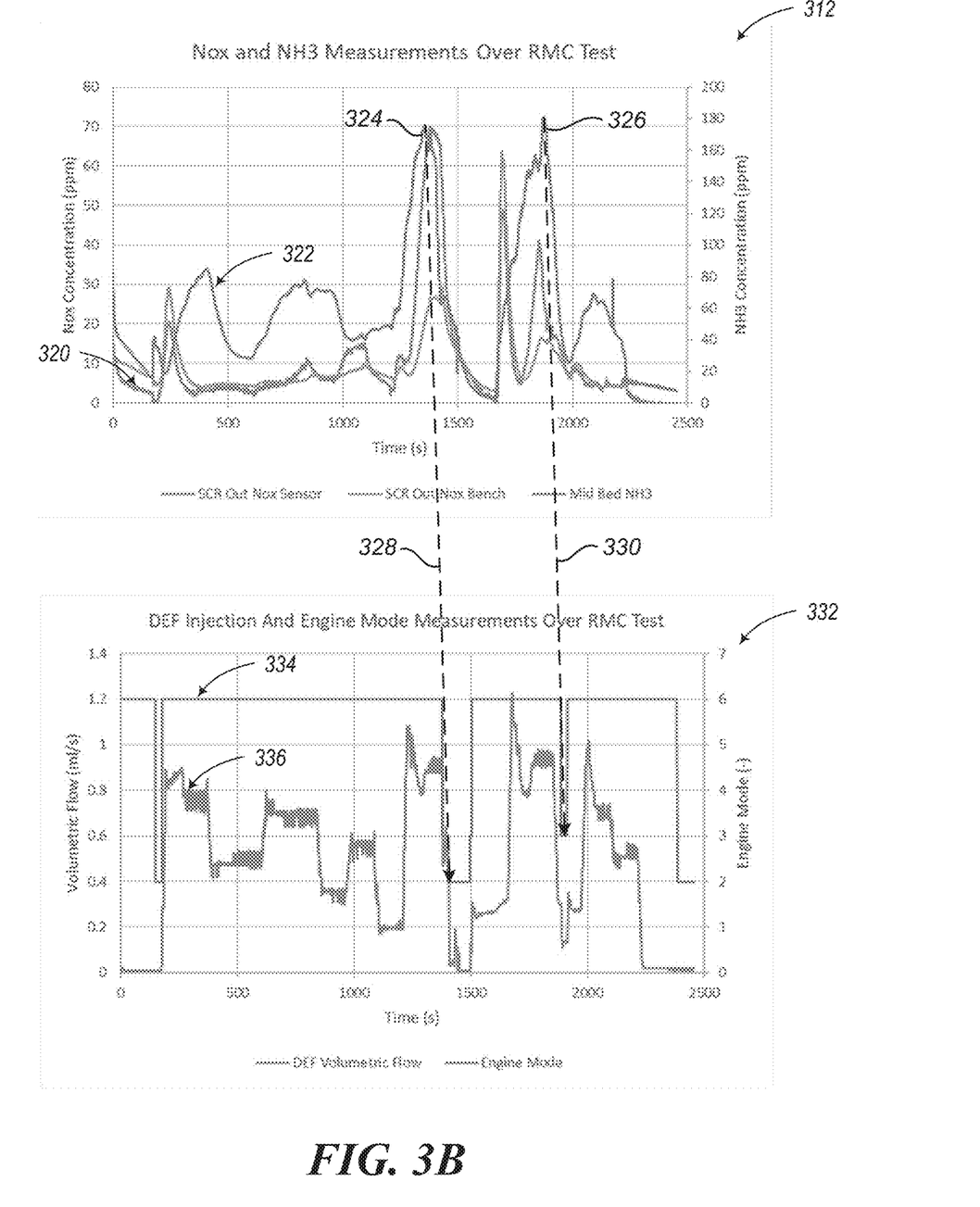

FIGS. 3A-3B are example graphs of results from a ramped mode cycle test of a vehicle engine, in accordance with embodiments described herein. A ramped mode cycle (RMC) test is a multi-mode steady-state engine dynamometer test to measure engine emissions and demonstrate compliance with emission standards. The ramped mode cycle test is performed as a continuous cycle with ramped transitions between the individual modes of engine operation. The RMC test mimics different driving conditions. One such condition may be a vehicle going up a hill. In this condition, the driver often depresses the gas pedal to increase engine power and maintain vehicle speed, which is simulated by the mode changes during the RMC test.

Graph 302 in FIG. 3A shows exhaust temperature 304 and exhaust mass flow 306 as a function of time during an RMC test. The different mode changes are visible by the different "steps" in the exhaust mass flow 306. As the modes change, the exhaust mass flow 306 and exhaust temperature 304 also change. These changes are characterized as a change in enthalpy of the engine exhaust, which may be represented as dH as a function of time (t). Ammonia slip often occurs when there are extreme changes in enthalpy. Peaks 308 and 310 represent two conditions that resulted in such changes in enthalpy during the RMC test.

Graph 312 in FIG. 3A shows nitrogen oxide (NOx) 320 and ammonia ($NH_3$) 322 sensor readings as a function of time during the RMC test. A NOx benchmark 318 for the RMC test is also shown. As the engine is transitioned between different modes, the NOx 320 and $NH_3$ 322 sensor readings fluctuate. When large changes in enthalpy occur, such as when the RMC test simulates a vehicle going up a hill, the $NH_3$ 322 sensor readings also spikes due to uncontrolled release of $NH_3$. For example, when the enthalpy changes at peak 308 and 310, the $NH_3$ 322 also peaks at 324 and 326, respectively. Representative arrows 314 and 316 correlate these peaks between graph 302 and 312. This spike in $NH_3$ is the uncontrolled release of $NH_3$, or ammonia slip.

Unfortunately, due to the chemical properties of $NH_3$, commercially available NOx sensors do not adequately discriminate between $NH_3$ and NOx, which results in incorrect NOx readings. As a result, the NOx sensor detects both the presence of NOx and the presence of $NH_3$, without being able to distinguish between the two, which results in an incorrectly high amount of NOx being detected during the RMC test.

When the controller determines that tailpipe NOx cannot be properly controlled in the high efficiency mode (e.g., as characterized by high relative DEF dosing), the controller will switch the engine into a mode characterized by lower engine-out NOx (e.g., by increased exhaust gas recirculation (EGR), retarded injection timing, or a combination thereof).

Unfortunately, if $NH_3$ is detected by the NOx sensor, then the engine system believes that there is an abundance of NOx, even though there is not. As a result, the engine mode may change to accommodate this higher amount of detected NOx. But because there is actually less NOx than what is detected, the engine mode change may be improper and may result in degraded engine performance and efficiency.

As discussed above, graph 312 shows NOx 320 and $NH_3$ 322 sensor readings as a function of time during the RMC test, which is reproduced in FIG. 3B. Moreover, graph 312 shows ammonia slip at peaks 324 and 326.

Graph 332 in FIG. 3B shows engine mode 334 and DEF volumetric flow 336 as a function of time during the RMC test. When the $NH_3$ 322 peaks at 324 and 326, the system senses this as NOx, and thus believes there is an increased amount of NOx. As a result, the engine mode 334 changes from "mode 6" to "mode 2" in response to the $NH_3$ 322 peak at 324 and from mode 6 to mode 3 in response to the $NH_3$ 322 peak at 326, which are represented by dashed arrows 328 and 330, respectively.

As mentioned above, and as further discussed below, to reduce ammonia slip caused by changes in engine exhaust gas enthalpy, and thus reduce incorrect engine mode changes, the system generates a predicted amount of stored ammonia and a predicted enthalpy change to predict the amount of uncontrolled ammonia release such that countermeasures can be employed to reduce the enthalpy change and ammonia slip.

Figure 4:
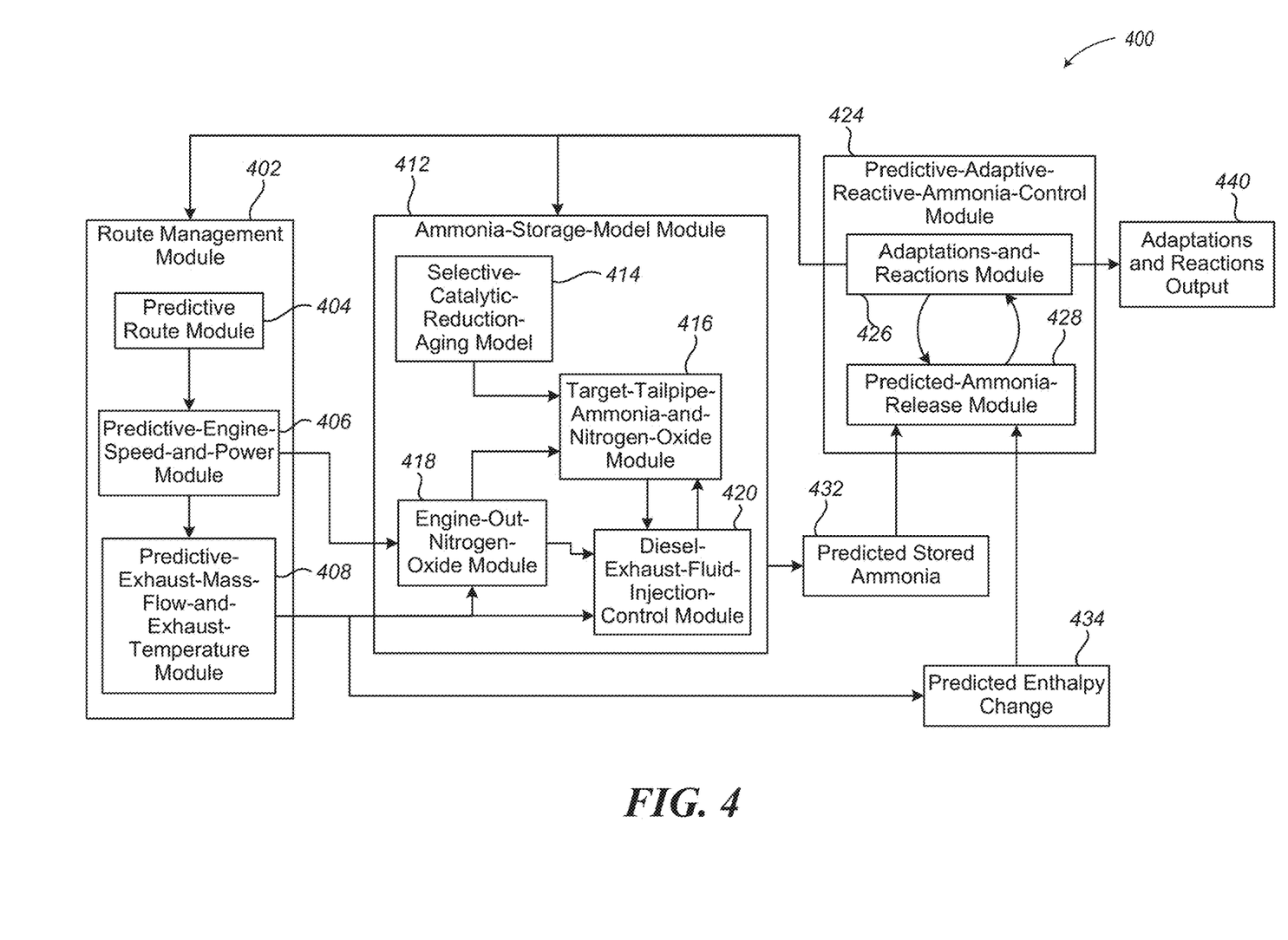
FIGS. 4 and 5 are context diagrams of a predictive-ammonia-release control system, in accordance with embodiments described herein.

FIG. 4 is a context diagram of a predictive-ammonia-release control system 400, in accordance with embodiments described herein. The predictive-ammonia-release control system 400 may be an embodiment of or employed by the ammonia controller 150 in FIG. 1. The predictive-ammonia-release control system 400 includes a route management module 402, an ammonia-storage-model module 412, and a predictive-adaptive-reactive-ammonia-control module 424.

The route management module 402 includes a predictive route module 404, a predictive-engine-speed-and-power module 406, and a predictive-exhaust-mass-flow-and-exhaust-temperature module 408. The predictive route module 404 generates a route prediction of where the vehicle is travelling. In some embodiments, terrain information is obtained for an upcoming segment of road along which the vehicle is traveling (e.g., the next one kilometer of road). This terrain information may be obtained by comparing the vehicle's current GPS location and historical GPS locations to a road map to determine on which road and in which direction the vehicle is travelling. A topographical map may also be used to detect changes in terrain along the upcoming road segment.

The predictive-engine-speed-and-power module 406 utilizes the terrain information to generate a model that predicts the engine speed and power along the upcoming road segment. In various embodiments, a table or other data structure of terrain changes (e.g., road gradient percentages) may be used to predict the engine speed and power. In some embodiments, vehicle weight, the type of vehicle, type of engine, whether conditions, or other vehicle information may be used to model the predicted engine speed and power. In yet other embodiments, the engine-speed-and-power model may be generated through testing and monitoring engine performance over various different terrain changes.

The predictive-exhaust-mass-flow-and-exhaust-temperature module 408 utilizes the engine-speed-and-power model to generate a model that predicts the exhaust mass flow and the exhaust temperature along the upcoming road segment. In various embodiments, a table or other data structure of exhaust mass flow and exhaust temperature relative to engine speed and power may be used to predict the exhaust mass flow and exhaust temperature. In some embodiments, the type of engine, whether conditions, or other information may be used to model the predicted exhaust mass flow and exhaust temperature. In yet other embodiments, the exhaust-mass-flow-and-exhaust temperature model may be generated through testing and monitoring engine performance over various different engine speed and power settings.

The ammonia-storage-model module 412 includes a selective-catalytic-reduction-aging model 414, a target-tailpipe-ammonia-and-nitrogen-oxide module 416, an engine-out-nitrogen-oxide module 418, and a diesel-exhaust-fluid-injection-control module 420. The selective-catalytic-reduction-aging model 414 is a stored model of the aging properties of a selective catalytic reduction system. As a selective catalytic reduction system is used to convert NOx into nitrogen and water, its performance or ability to convert NOx ages or degrades over time. The selective-catalytic-reduction-aging model simulates this degradation.

The engine-out-nitrogen-oxide module 418 utilizes the results of the predictive-engine-speed-and-power module 406 and the results of the predictive-exhaust-mass-flow-and-exhaust-temperature module 408 to generate a model of the amount of NOx that will be generated and output by the engine. The engine-out-nitrogen-oxide model may be generated based on known characteristics of the chemical process that creates NOx given engine speed, engine power, exhaust mass flow, and exhaust temperature. Once generated, the engine-out-nitrogen-oxide model can be used to predict an amount of NOx release as a function of various input parameters (e.g., terrain information), which can then be used to select, suggest, or employ one or more countermeasures, as described herein.

The target-tailpipe-ammonia-and-nitrogen-oxide module 416 generates estimates the amount of tailpipe ammonia and NOx based on the selective-catalytic-reduction-aging model 414, the results of the engine-out-nitrogen-oxide module 418, and results from the diesel-exhaust-fluid-injection-control module 420. In various embodiments, these estimates are determined based on known characteristics of the chemical process that uses urea to generate ammonia to convert the NOx into nitrogen and water.

The diesel-exhaust-fluid-injection-control module 420 controls the selective catalytic reduction system's use of urea to generate ammonia to convert the NOx into nitrogen. In various embodiments, the diesel-exhaust-fluid-injection-control module 420 predicts an amount of stored ammonia 432 based on the results from the predictive-exhaust-mass-flow-and-exhaust-temperature module 408, the engine-out-nitrogen-oxide module 418, and the target-tailpipe-ammonia-and-nitrogen-oxide module 416. In some embodiments, the predicted stored ammonia 432 is determined based on known characteristics of the chemical process of reducing NOx using ammonia.

The predictive-exhaust-mass-flow-and-exhaust-temperature module 408 are also used to determine a predicted enthalpy change 434. In various embodiments, a table or other data structure of changes in exhaust mass flow and exhaust temperature over time may be used to generate the predicted enthalpy change 434. In some embodiments, a regenerative powertrain model, current or predicted engine mode, or status and state of the engine, or some combination thereof, may be used to generate the predicted enthalpy change 434. The predicted enthalpy change 434 may be a single value based on the predicted terrain in the upcoming segment of road or it may be a function of changes in the predicted terrain.

The predictive-adaptive-reactive-ammonia-control module 424 includes a predicted-ammonia-release module 428. The predicted-ammonia-release module 428 generates a model of the ammonia that is predicted to be released during the upcoming segment of road based on the predicted stored ammonia 432 and the predicted enthalpy change 434. Because the predicted enthalpy change 434 takes into account the predicted exhaust mass flow and the predicted exhaust temperature for a select or identified segment of road, and because the predicted stored ammonia 432 takes into account the DEF control, aging of the selective catalytic reduction system, the engine speed and power, and the exhaust mass flow and temperature, the predicted-ammonia-release model provides representation of how much ammonia is likely to be released as the vehicle traverses the selected or identified road segment.

In various embodiments, one or more artificial intelligence or machine learning mechanisms may be employed on known engine and terrain data to generate one or more of the models described herein.

The predictive-adaptive-reactive-ammonia-control module 424 also includes an adaptations-and-reactions module 426. The adaptations-and-reactions module 426 has access to one or more countermeasures that can be employed to reduce the amount of ammonia released. In some embodiments, a table or other data structure may store indications or identifiers of such countermeasures and their predicted behavior (e.g., how the engine would respond to the countermeasure). Examples of such countermeasures may include, but are not limited to, changing a current speed of the engine, increasing the temperature of combustion of the engine, downshifting, adjusting the chassis height over the axle, or modifying other operating parameters or characteristics of the engine that impact the predicted stored ammonia 432 or the predicted enthalpy change 434.

In various embodiments, the adaptations-and-reactions module 426 selects one or more countermeasures based on the predicted ammonia release from the predicted-ammonia-release module 428. In some embodiments, the adaptations-and-reactions module 426 may also take into account the current engine mode or the current status or state of the engine in selecting the countermeasures. Various different parameters or thresholds may be used to select the countermeasures. For example, if the predicted ammonia release is X and the current exhaust temperature is A, then the selected countermeasure may be M. But if the predicted ammonia release is Y and the current exhaust temperature is A, then the selected countermeasure may be N. Given the dynamic range and type of possible countermeasures, generic variables are used as examples, but one of ordinary skill in the art would understand which and how countermeasures can be selected for different predicted amounts of ammonia release and different engine conditions.

In some embodiments, the predicted-ammonia-release module 428 can utilize the selected countermeasures from the adaptations-and-reactions module 426 to update or modify the predicted ammonia release model. In various embodiments, the predicted-ammonia-release module 428 and the adaptations-and-reactions module 426 can utilize a dynamic feedback loop to iteratively determine or modify the predicted ammonia release with the goal of identifying a smallest predicted amount of uncontrolled ammonia release.

In at least one embodiment, the results of the adaptations-and-reactions module 426 may be provided to the route management module 402 or the ammonia-storage-model module 412, or some combination thereof. These modules can use the selected countermeasures to dynamically adjust the various models to update the predicted stored ammonia 432 or the predicted enthalpy change 434, or both.

In various embodiments, an adaptations and actions output 440 may be generated from the results of the predictive-adaptive-reactive-ammonia-control module 424. The adaptations and actions output 440 may be a list or other data structure of predicted ammonia release and corresponding countermeasures.

In some embodiments, the route management module 402, ammonia-storage-model module 412, and the predictive-adaptive-reactive-ammonia-control module 424 may be employed by the ammonia controller 150 or other computing system on the vehicle. In this way, the vehicle can dynamically predict ammonia release and enthalpy change to select countermeasures to employ along a route.

In other embodiments, the route management module 402, ammonia-storage-model module 412, or the predictive-adaptive-reactive-ammonia-control module 424, or some combination thereof, may be employed by a server or computing system that is remote from the vehicle. In at least one embodiment, it may employ a variety of different possible terrain scenarios to generate separate countermeasure results for each scenario. These results (e.g., the adaptations and reactions output 440) may be provided to the vehicle, such that the vehicle can perform a lookup of which countermeasure to employ for the terrain in an upcoming segment of road. In this way, the vehicle can perform faster selections of countermeasures without having to regenerate one or more models.

Figure 5:
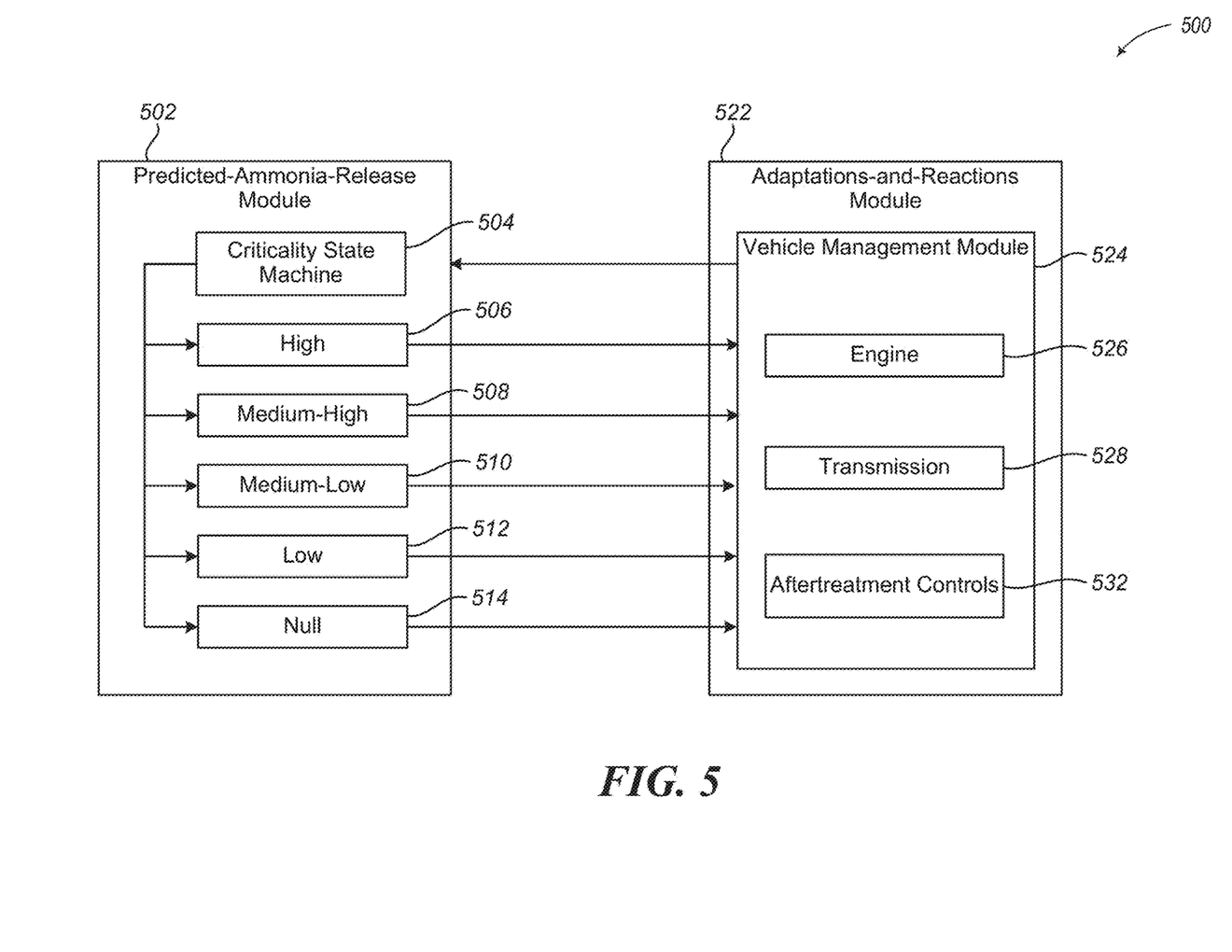

FIG. 5 is a context diagram of additional aspects of a predictive-ammonia-release control system 500, in accordance with embodiments described herein.

The system 500 includes a predicted-ammonia-release module 502 and an adaptations-and-reactions module 522, which may be embodiments of the predicted-ammonia-release module 428 and the adaptations-and-reactions module 426 in FIG. 4.

In some embodiments, the predicted-ammonia-release module 502 may employ a criticality state machine 504. The criticality state machine 504 may determine a criticality associated with the predicted uncontrolled release of ammonia. The criticality may be selected based on the amount of ammonia to be released, the duration of ammonia release, the duration of recovery (e.g., how long is the engine in an engine mode that is incorrect for the actual amount of NOx being generated), or other parameters.

In the illustrated example in FIG. 5, there are five criticality states, high 506, medium-high 508, medium-low 510, low 512, and null 514. High 506 may be characterized as high predicted enthalpy change and high predicted $NH_3$ storage. Medium-high 508 may be characterized as (1) high predicted enthalpy change and medium predicted $NH_3$ storage or (2) medium predicted enthalpy change and high predicted $NH_3$ storage. Medium-Low 510 may be characterized as medium predicted enthalpy change and medium predicted $NH_3$ storage. Low 512 may be characterized as (1) medium predicted enthalpy change and low predicted $NH_3$ storage or (2) low predicted enthalpy change and medium predicted $NH_3$ storage. Null 514 may be characterized as low predicted enthalpy change and low predicted $NH_3$ storage. The terms low, medium, and high may be threshold amounts or values. In some embodiments, these thresholds may be selected by an administrator. In other embodiments, the thresholds may be determined by a machine learning mechanism that is trained on historical data of uncontrolled ammonia release in response to enthalpy change and stored ammonia. Moreover, the thresholds may change depending on vehicle type, emissions standards, engine setting or performance, or other parameters.

The adaptations-and-reactions module 522 can utilize the critically to select one or more countermeasures. The adaptations-and-reactions module 522 may include a vehicle management module 524, which selects countermeasures and controls one or more features of the engine or vehicle to implement the selected countermeasures. For example, the vehicle management module 524 may control the engine 526 (e.g., modifying the engine speed), adjust the transmission 528 (e.g., downshifting), or modify the aftertreatment controls 432 (e.g., reduce DEF injection rates or reduce exhaust gas recirculation mass flow), etc. One or more of these countermeasures can be employed depending on the criticality.

It should be noted that these examples are for illustrative purposes and other criticality measures or countermeasures may be employed.

The operation of certain aspects will now be described with respect to FIG. 6. In at least one of various embodiments, process 600 described in conjunction with FIG. 6 may be implemented by or executed via circuitry or on one or more computers, such as ammonia controller 150. Moreover, the various modules in FIGS. 4 and 5 may be used to implement one or more aspects of process 600.

Figure 6:
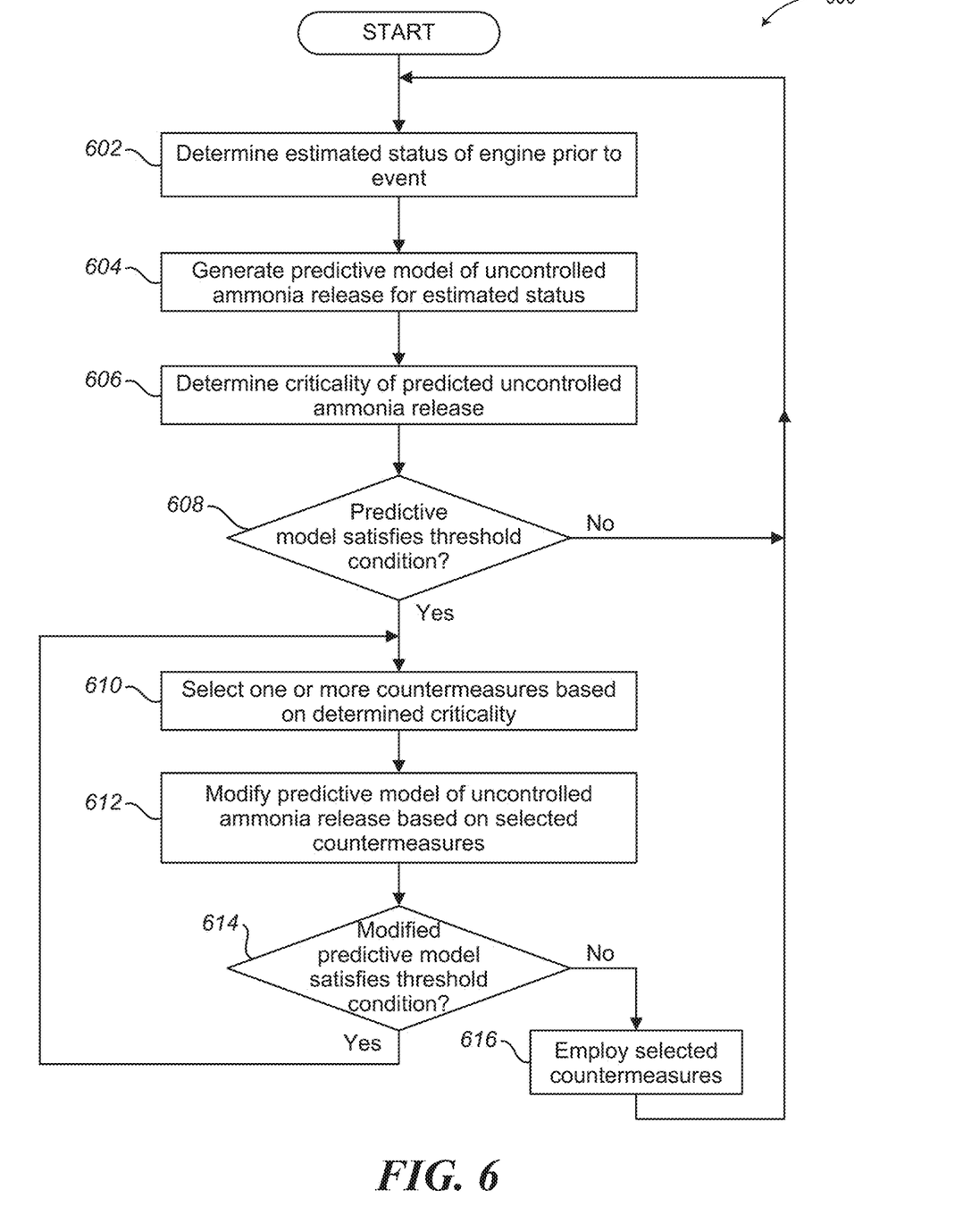
FIG. 6 is a flow diagram for a method of operating a predictive-ammonia-release control system, in accordance with embodiments described herein.

FIG. 6 is a flow diagram for a method 600 of operating a predictive-ammonia-release control system, in accordance with embodiments described herein. Process 600 begins, after a start block, at block 602, where an estimated status of a vehicle engine is determined prior to an event. In some embodiments, the event may be associated with a change or likely change in the performance or utilization of the vehicle engine. For example, the event may be a model of the terrain in an upcoming segment of road. Or the event may be an indication that the vehicle is to pass another vehicle. In at least one embodiment, the event may be a situation that may induce additional load on the engine.

In some embodiments, the estimated status may include the predicted engine speed and power, predicted exhaust mass flow and exhaust temperature, or other vehicle states or conditions associated with the event. In other embodiments, the estimated status may include the predicted stored ammonia and the predicted enthalpy change associated with the event. In at least one embodiment, the estimated status is the estimated load on the engine that could result in ammonia slip.

Process 600 proceeds to block 604, where a predictive model of uncontrolled ammonia release is generated for the estimated status, such as discussed above based on predicted stored ammonia and predicted enthalpy change.

Process 600 continues at block 606, where a criticality of the predicted uncontrolled ammonia release is determined. As discussed above, one or more criticality thresholds or indicators may be determined.

Process 600 proceeds next to decision block 608, where a determination is made whether the predictive model satisfies at least one threshold condition. Satisfying the threshold may occur when ammonia slip is predicted and one or more countermeasures should be employed based on the determined criticality of the predicted ammonia release. If the predictive model satisfies a threshold condition, then process 600 flows to block 610; otherwise, process 600 loops to block 602 to determine the estimated status of the engine prior to a next event (e.g., another hill or a steeper portion of the current hill).

At block 610, where on or more countermeasures are selected based on the determined criticality, as discussed above.

Process 600 continues at block 612, where the predictive model of uncontrolled ammonia release is modified based on the selected countermeasure. In various embodiments, an effect of the selected countermeasure is determined and employed into generating the predicted ammonia release. For example, if the countermeasure is to downshift, then an estimated increase in revolutions per minute and corresponding engine temperature changes can be determined and taken into account when predicting ammonia release for the event.

Process 600 proceeds next to decision block 614 to determine if the modified predictive model satisfies the one or more threshold conditions. In various embodiments, decision block 614 may employ embodiments of decision block 608 to determine if the modified predictive model satisfies a threshold condition. If the modified predictive model satisfies a threshold condition, then process 600 loops to block 610 to select one or more different countermeasures; otherwise, process 600 flows to block 616. In some embodiments, the modified predictive model may not satisfy a threshold condition when a lowest amount of predicted ammonia release is determined among a plurality of different countermeasure options.

At block 616, the selected countermeasures are employed. In some embodiments, one or more of the selected countermeasures are automatically employed. In other embodiments, a notification, warning, or other information may be presented to the driver of the vehicle to employ one or more of the selected countermeasures. For example, a head unit or other visual or audio interface may display a warning to the driver instructing the driver to downshift prior to the event occurring, e.g., prior to the vehicle reaching a hill.

Although process 600 is described as be implemented by a controller or computing device on a vehicle, embodiments are not so limited; rather, in some embodiments, a computing device remote from the vehicle may perform the functions of process 600 and provide the selected countermeasures to the vehicle for implementation.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling uncontrolled release of ammonia from an engine of a vehicle, the method comprising:
   determining, by at least one processor, an estimated status of the engine prior to an event;
   generating, by the at least one processor, a predictive model of uncontrolled ammonia release for the estimated status;
   selecting, by the at least one processor, at least one engine-related countermeasure based on the predictive model; and
   employing the selected at least one engine-related countermeasure.

2. The method of claim 1, further comprising:
   determining, by the at least one processor and prior to selecting the at least one engine-related countermeasure, that the predictive model satisfies at least one threshold condition.

3. The method of claim 1, further comprising:
   determining, by the at least one processor and prior to selecting the at least one engine-related countermeasure, a criticality of uncontrolled ammonia release based on the predictive model; and
   selecting, by the at least one processor, the at least one engine-related countermeasure based on the determined criticality of uncontrolled ammonia release.

4. The method of claim 3, wherein determining the criticality of uncontrolled ammonia release further comprises:
   determining, by the at least one processor, a change in enthalpy of exhaust gas of the engine from a current status of the engine to the estimated status.

5. The method of claim 1, further comprising:
   modifying, by the at least one processor, the predictive model based on the selected countermeasure; and
   selecting, by the at least one processor, at least one different countermeasure based on the modified predictive model.

6. The method of claim 1, wherein determining the estimated status of the engine prior to the event comprises:
   determining, by the at least one processor, a current location of the vehicle;
   determining, by the at least one processor, a route of travel of the vehicle from the current location based on a road map;
   identifying, by the at least one processor, terrain along the route of travel based on a topography map; and
   determining, by the at least one processor, the estimated status of the engine based on one or more characteristics of the identified terrain.

7. The method of claim 1, wherein selecting the at least one engine-related countermeasure comprises at least one of:

selecting, by the at least one processor, a change in a current speed of the engine;
selecting, by the at least one processor, an increase in temperature of combustion of the engine; or
selecting, by the at least one processor, a downshift operation from a current gear selection of the vehicle.

8. A predictive-ammonia-release control system for a vehicle, comprising:
a memory that stores computer instructions; and
at least one processor that executes the computer instructions to:
determine an estimated status of an engine of the vehicle prior to an event;
generate a predictive model of uncontrolled ammonia release for the estimated status;
select at least one engine-related countermeasure based on the predictive model; and
employ the selected at least one engine-related countermeasure.

9. The predictive-ammonia-release control system of claim 8, wherein the at least one processor further executes the computer instructions to:
determine, prior to selecting the at least one engine-related countermeasure, that the predictive model satisfies at least one threshold condition.

10. The predictive-ammonia-release control system of claim 8, wherein the at least one processor further executes the computer instructions to:
determine, prior to selecting the at least one engine-related countermeasure, a criticality of uncontrolled ammonia release based on the predictive model; and
select the at least one engine-related countermeasure based on the determined criticality of uncontrolled ammonia release.

11. The predictive-ammonia-release control system of claim 10, wherein the at least one processor determines the criticality of uncontrolled ammonia release by further executing the computer instructions to:
determine a change in enthalpy of exhaust gas of the engine from a current status of the engine to the estimated status.

12. The predictive-ammonia-release control system of claim 8, wherein the at least one processor further executes the computer instructions to:
modify the predictive model based on the selected countermeasure; and
select at least one different countermeasure based on the modified predictive model.

13. The predictive-ammonia-release control system of claim 8, wherein the at least one processor determines the estimated status on the engine prior to the event by further executing the computer instructions to:
determine a current location of the vehicle;
determine a route of travel of the vehicle from the current location based on a road map;
identify terrain along the route of travel based on a topography map; and
determine the estimated status of the engine based on one or more characteristics of the identified terrain.

14. The predictive-ammonia-release control system of claim 8, wherein the at least one processor selects the at least one engine-related countermeasure by further executing the computer instructions to:
select a change in a current speed of the engine;
select an increase in temperature of combustion of the engine; or
select a downshift operation from a current gear selection of the vehicle.

15. A non-transitory computer-readable storage medium having stored thereon instructions that when executed by at least one processor, cause the at least one processor to perform actions, the actions comprising:
determining an estimated status of an engine of a vehicle prior to an event;
generating a predictive model of uncontrolled ammonia release for the estimated status;
selecting at least one engine-related countermeasure based on the predictive model; and
employing the selected at least one engine-related countermeasure.

16. The non-transitory computer-readable storage medium of claim 15, wherein execution of the instructions by the at least one processor, cause the at least one processor to perform further actions, the further actions comprising:
determining, prior to selecting the at least one engine-related countermeasure, that the predictive model satisfies at least one threshold condition.

17. The non-transitory computer-readable storage medium of claim 15, wherein execution of the instructions by the at least one processor, cause the at least one processor to perform further actions, the further actions comprising:
determining, prior to selecting the at least one engine-related countermeasure, a criticality of uncontrolled ammonia release based on the predictive model; and
selecting the at least one engine-related countermeasure based on the determined criticality of uncontrolled ammonia release.

18. The non-transitory computer-readable storage medium of claim 15, wherein execution of the instructions by the at least one processor, cause the at least one processor to perform further actions, the further actions comprising:
modifying, by the at least one processor, the predictive model based on the selected countermeasure; and
selecting at least one different countermeasure based on the modified predictive model.

19. The non-transitory computer-readable storage medium of claim 15, wherein determining the estimated status on the engine prior to the event comprises:
determining a current location of the vehicle;
determining a route of travel of the vehicle from the current location based on a road map;
identifying terrain along the route of travel based on a topography map; and
determining the estimated status of the engine based on one or more characteristics of the identified terrain.

20. The non-transitory computer-readable storage medium of claim 15, wherein selecting the at least one engine-related countermeasure comprises at least one of:
selecting a change in a current speed of the engine;
selecting, by the at least one processor, an increase in temperature of combustion of the engine; or
selecting, by the at least one processor, a downshift operation from a current gear selection of the vehicle.

* * * * *